US008192288B2

(12) United States Patent
Sylla et al.

(10) Patent No.: US 8,192,288 B2
(45) Date of Patent: Jun. 5, 2012

(54) REMOTE MANAGEMENT OF A GAMING MACHINE THROUGH RETRIEVAL OF AN INVENTORY OF ASSETS

(75) Inventors: Craig J. Sylla, Round Lake, IL (US); Mark B. Gagner, West Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 896 days.

(21) Appl. No.: 11/997,610

(22) PCT Filed: Aug. 14, 2006

(86) PCT No.: PCT/US2006/031417

§ 371 (c)(1), (2), (4) Date: Feb. 1, 2008

(87) PCT Pub. No.: WO2007/024512

PCT Pub. Date: Mar. 1, 2007

(65) Prior Publication Data

US 2008/0318658 A1 Dec. 25, 2008

Related U.S. Application Data

(60) Provisional application No. 60/710,520, filed on Aug. 23, 2005.

(51) Int. Cl.

| | |
|---|---|
| ***G06F 17/00*** | (2006.01) |
| ***G06F 19/00*** | (2006.01) |
| ***A63F 9/24*** | (2006.01) |
| ***A63F 13/00*** | (2006.01) |

(52) U.S. Cl. ............................... 463/42; 463/16; 463/29

(58) Field of Classification Search .................. 707/705; 711/170; 463/16-29, 40-42

See application file for complete search history.

(56) References Cited

U.S. PATENT DOCUMENTS

| | | | | |
|---|---|---|---|---|
| 5,923,249 | A * | 7/1999 | Muir | 340/545.1 |
| 6,219,836 | B1 * | 4/2001 | Wells et al. | 717/178 |
| 6,237,051 | B1 * | 5/2001 | Collins | 710/36 |
| 6,477,667 | B1 * | 11/2002 | Levi et al. | 714/57 |
| 6,772,253 | B1 * | 8/2004 | Slaight et al. | 710/105 |
| 6,804,763 | B1 * | 10/2004 | Stockdale et al. | 711/170 |
| 6,805,634 | B1 * | 10/2004 | Wells et al. | 463/42 |
| 6,890,259 | B2 | 5/2005 | Breckner et al. | |
| 7,073,050 | B2 * | 7/2006 | Chen et al. | 713/1 |
| 7,506,038 | B1 * | 3/2009 | Perrone et al. | 709/220 |

(Continued)

OTHER PUBLICATIONS

"International Search Report for Application No. PCT/US2006/31417, date mailed Jun. 21, 2007", 6 pgs.

(Continued)

*Primary Examiner* — Milap Shah

(74) *Attorney, Agent, or Firm* — Schwegman, Lundberg & Woessner, P.A.

(57) ABSTRACT

Systems, apparatus and methods for remote management of a gaming machine are described herein. In some embodiments, an apparatus includes a host platform having a host processor controlled by a host operating system. The host platform has a host storage and a host power state, wherein the host processor is to execute instructions that includes a wagering game. The apparatus also includes a subsystem that is operable independent of the host operating system and the host power state. The subsystem includes a processor that is separate from the host processor. The subsystem also includes a nonvolatile data store that is separate from the storage of the host platform.

27 Claims, 7 Drawing Sheets

U.S. PATENT DOCUMENTS

| | | | | |
|---|---|---|---|---|
| 7,546,534 | B1 * | 6/2009 | Andrews et al. | 715/747 |
| 7,785,204 | B2 * | 8/2010 | Wells et al. | 463/42 |
| 7,937,549 | B2 * | 5/2011 | Goodman et al. | 711/170 |
| 2002/0032051 | A1 | 3/2002 | Stockdale | |
| 2002/0115487 | A1 | 8/2002 | Wells | |
| 2003/0003997 | A1 * | 1/2003 | Vuong et al. | 463/42 |
| 2003/0056131 | A1 * | 3/2003 | Eberhard et al. | 713/320 |
| 2004/0122924 | A1 * | 6/2004 | Coryell et al. | 709/223 |
| 2004/0132530 | A1 * | 7/2004 | Rutanen et al. | 463/42 |
| 2004/0267714 | A1 * | 12/2004 | Frid et al. | 707/3 |
| 2005/0046571 | A1 * | 3/2005 | Stigall | 340/572.1 |
| 2005/0192099 | A1 * | 9/2005 | Nguyen et al. | 463/42 |
| 2005/0227769 | A1 * | 10/2005 | Morrow et al. | 463/42 |
| 2006/0101517 | A1 * | 5/2006 | Banzhof et al. | 726/25 |
| 2006/0247004 | A1 * | 11/2006 | Tanimura | 463/20 |
| 2006/0287098 | A1 * | 12/2006 | Morrow et al. | 463/42 |
| 2007/0001827 | A1 * | 1/2007 | Asbjornsen et al. | 340/426.13 |
| 2008/0177969 | A1 * | 7/2008 | Miriyala et al. | 711/170 |
| 2008/0211670 | A1 * | 9/2008 | Gordon | 340/572.1 |
| 2009/0234823 | A1 * | 9/2009 | Wong | 707/4 |

OTHER PUBLICATIONS

"Written Opinion of the International Searching Authority for Application No. PCT/US2006/31417, date mailed Jun. 21, 2007", 8 pgs.

* cited by examiner

REMOTE MANAGEMENT OF A GAMING MACHINE THROUGH RETRIEVAL OF AN INVENTORY OF ASSETS

RELATED APPLICATIONS

This application is a U.S. National Stage Filing under 35 U.S.C. 371 from International Patent Application Ser. No. PCT/US2006/031417, filed Aug. 14, 2006, and published on Mar. 1, 2007 as WO 2007/024512 A2, and republished as WO 2007/024512 A3, which claims the priority benefit of U.S. Provisional Application Ser. No. 60/710,520, filed Aug. 23, 2005, the contents of which are incorporated herein by reference.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

BACKGROUND

1. Field

This invention relates generally to the field of computerized wagering gaming machines and more particularly to the field of remote management of computerized wagering gaming machines.

2. Description of Related Art

Wagering gaming machines that are out-of-service can be very costly to the casinos having such machines on their floors and possibly to the gaming machine manufacturers that are receiving a part of the revenue generated by such games. Therefore, keeping the gaming machines operational is a high priority. Typically, to determine whether a gaming machine is out-of-service and to repair such a machine, the casino operators must be physically present at the gaming machine. For gaming machine operators owning scores of machines, this process can be laborious and expensive.

Moreover, wagering game makers continually provide new and entertaining games. One way of increasing entertainment value associated with casino-style wagering games (e.g., video slots, video poker, video black jack, and the like) includes offering a base game and a variety of bonus events. However, despite the variety of bonus events, players often lose interest in repetitive gaming content. In order to maintain player interest, wagering game machine makers frequently update game themes, game settings, bonus events, and other gaming content.

In order to satisfy player demands, gaming machine operators or manufacturers continuously license and deploy new gaming content to gaming machines operating in the field. Gaming machine operators or manufacturers typically update gaming content by manually delivering updated gaming content to each gaming machine. For example, when a gaming machine's gaming content becomes undesirable or a license expires, an operator or manufacturer typically replaces existing media (e.g. ROM, CD-ROM, or flash memory) with new media containing updated gaming and licensing content. Accordingly, the tracking of the types and version of gaming content on the gaming machines typically involves some type of manual reporting process.

BRIEF DESCRIPTION OF THE FIGURES

The present invention is illustrated by way of example and not limitation in the Figures of the accompanying drawings in which.

DESCRIPTION OF THE EMBODIMENTS

Figure 1:
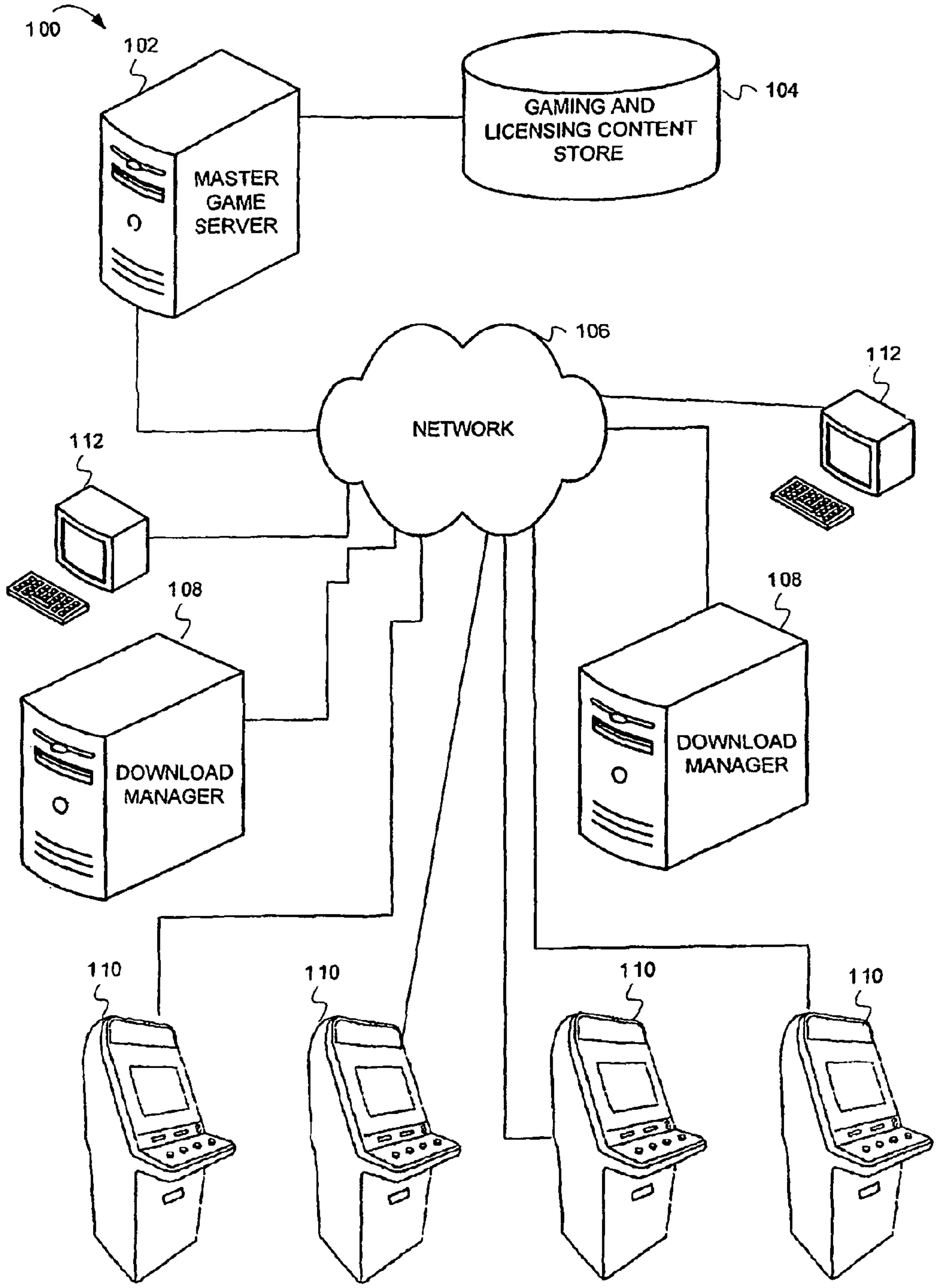
FIG. 1 is a block diagram illustrating a system for remote management of a gaming machine, according to some embodiments of the invention.

Systems, apparatus and methods for remote management of a gaming machine are described herein. This description of the embodiments is divided into four sections. The first section describes an overview of some embodiments. The second section describes an example operating environment and system architecture. The third section describes example operations. The fourth section provides some general comments.

Overview of Some Embodiments

In some embodiments, an apparatus includes a host platform having a host processor controlled by a host operating system. The host platform has a host storage and a host power state, wherein the host processor is to execute instructions that include a wagering game. The apparatus also includes a subsystem that is operable independent of the host operating system and the host power state. The subsystem includes a processor that is separate from the host processor. The subsystem also includes a nonvolatile data store that is separate from the storage of the host platform. In some embodiments, the nonvolatile storage is to store an identification of the wagering game. In some embodiments, the nonvolatile data store is to store an identification of a version of the wagering game. In some embodiments, the nonvolatile data store is to store an identification of the host platform. The host processor may execute instructions to store a log entry in the nonvolatile data store for a loggable event in the apparatus. The loggable event may include corruption of data in the storage of the host platform. The loggable event may include an installation of a new version of the host operating system. The loggable even includes an award above a monetary amount in the wagering game.

In some embodiments, a machine-readable medium including instructions which when executed by a machine causes the machine to perform operations. The operations comprise receiving a request, from a game server, for discovery for inventory of assets in a gaming machine having a host platform. The operations comprise retrieving a list of inventory of assets from a data store in a subsystem that is independent of a power state or an operating system state of the host platform. The operations comprise transmitting the list of inventory of assets back to the game server. In some embodiments, retrieving the list of inventory of assets comprises retrieving the list of inventory assets during a time when the power state of the host platform is off. The retrieving of the list of inventory of assets may comprise retrieving the list of inventory assets during a time when the operating system state of the host platform is non-operational. The retrieving of the list of inventory assets may comprise retrieving a list of games installed on the host platform of the gaming machine. The retrieving of the list of inventory assets may comprise retrieving a list of hardware assets of the host platform of the gaming machine.

In some embodiments, a method comprises, in response to a determination of an error in a host platform of a gaming machine, performing the operations within a subsystem of the gaming machine that is independent of the host platform. The operations may include transmitting a notification of the error in the host platform of the gaming machine over a network to a master game server. The operations may include receiving a repair communication from the master game server. In some embodiments, receiving the repair communication comprises receiving a repair application. Also, the operations may comprise executing the repair application within the subsystem. The receiving of the repair communication may comprise receiving an updated copy of a file. The receiving of the repair communication may comprise receiving a communication to cause a reboot of the host platform. In some embodiments, the error in the host platform may include an operating system error. Performing the operations within the subsystem of the gaming machine may comprise performing the operations within the subsystem of the gaming machine during at least part of a time when a power state of the host platform is off. Performing the operations within the subsystem of the gaming machine may comprise performing the operations within the subsystem of the gaming machine during at least part of a time when an operating system state of the host platform is non-operational.

Hardware, Operating Environment, and System Architecture

This section provides an example system architecture in which embodiments of the invention can be practiced. This section also describes an example computer system and gaming machine. Operations of the system components will be described in the next section.

Example System Architecture

FIG. 1 is a block diagram illustrating a system for remote management of a gaming machine, according to some embodiments of the invention. As shown in FIG. 1, a system 100 includes a master game server 102 which is connected to gaming and licensing content store 104. The master game server 102 is also connected to a network 106, which is connected to a pair of download managers 108. Each download manager 108 is connected to an administrator terminal 112 and pair of gaming machines 110.

The gaming and licensing content store 104 includes gaming content and licensing content. The gaming content can include instructions and/or data used for conducting casino style wagering games (e.g., video slots, video poker, video black jack, and the like). In some embodiments, the gaming content may include program code, audio content, video content, and/or other data used for conducting all or part of a casino style slots game and/or bonus events.

The licensing content may include data and/or instructions for enforcing a license for using gaming content. In some embodiments, the licensing content may be used to enforce any suitable licensing model.

In some embodiments, the master game server 102 distributes gaming and licensing content to the download managers 108. The download managers 108 may manage delivery of the gaming and licensing content to the gaming machines 110. In some embodiments, the master game server 202 distributes gaming and licensing content using one or more data packages, as described in greater detail below (see System Operations section).

In some embodiments, each gaming machine 110 serves as a thin client to a download manager 108 or other computer system. As a thin client, each gaming machine 110 includes logic for presenting and receiving gaming information, while logic for conducting games is disposed within the download manager 108 or other computer system (not shown). In another embodiment, the gaming machine 110 includes all logic for presenting and receiving gaming information and for conducting a game. The gaming machines 110 may be embodied in any suitable computing device, such as a desktop computer, laptop computer, or personal digital assistant.

The components of the system 100 may be connected using any suitable connection technology. For example, the components can be connected via RS-232,
Ethernet, 802.11, public switched telephone networks, DSL, or any other connection technology. The network 120 may be a local area network or wide-area network and can transmit licensing and gaming content using any suitable communication protocols. The administrator terminals 112 may be used for configuring and accessing licensing and gaming content stored in the download managers 108.

As further described below, in some embodiments, the master game server 102 may remotely manage one or more of the download managers 108, gaming machines 110, etc. The architecture of the download managers 108 and the gaming machines 110 may be partitioned into a host platform and a host-independent subsystem. The master game server 102 may access and remotely manage the host platform through the host-independent platform (independent of the power and operating system state of the host platform).

Figure 2:
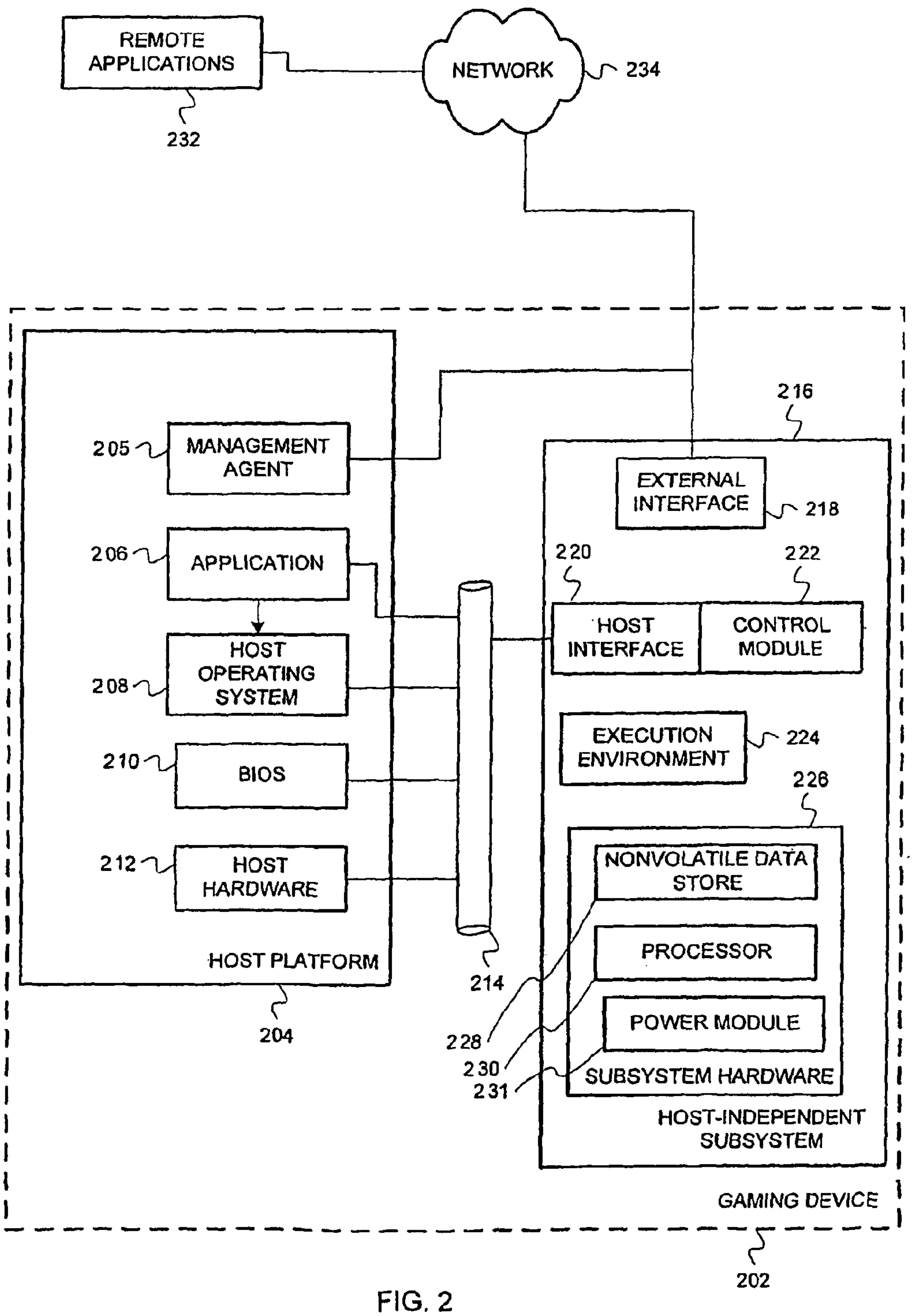
FIG. 2 illustrates a more detailed block diagram of parts of a game machine having a host independent subsystem for remote management, according to some embodiments of the invention.
Figure 3:
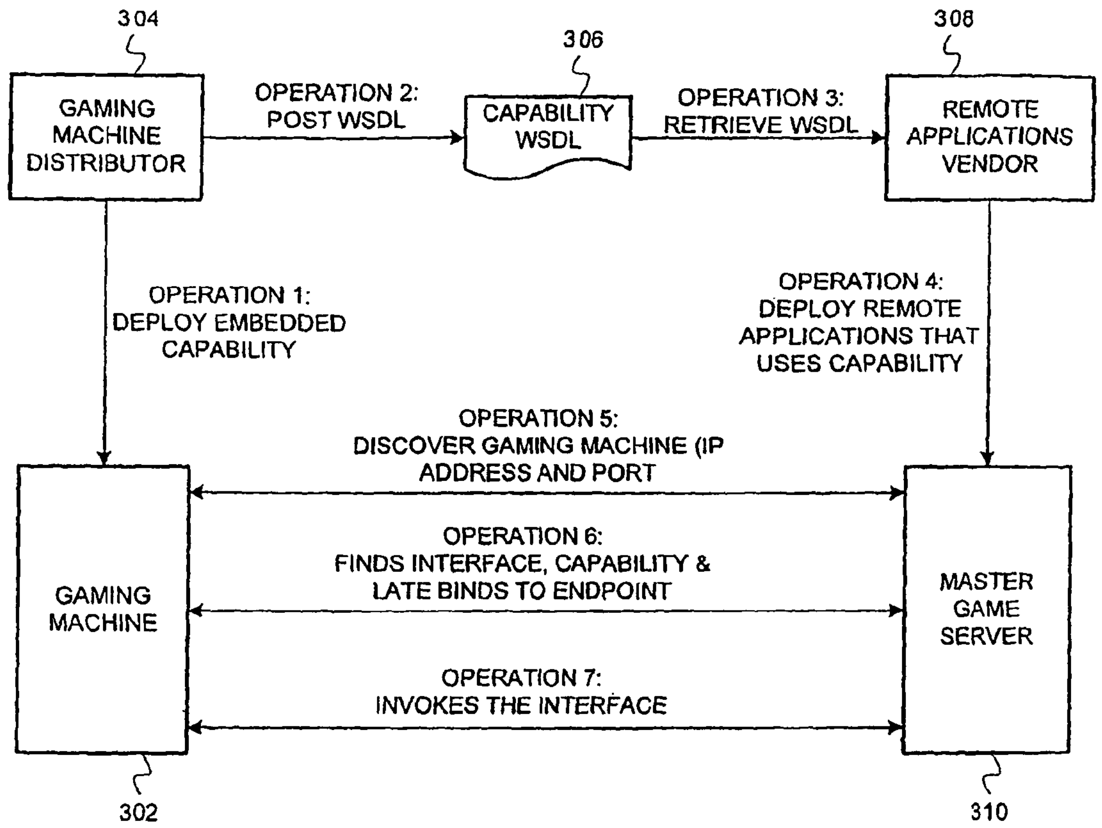
FIG. 3 illustrates a message flow at different stages of development and deployment of a gaming machine that includes a host-independent subsystem, according to some embodiments of the invention.
Figure 4:
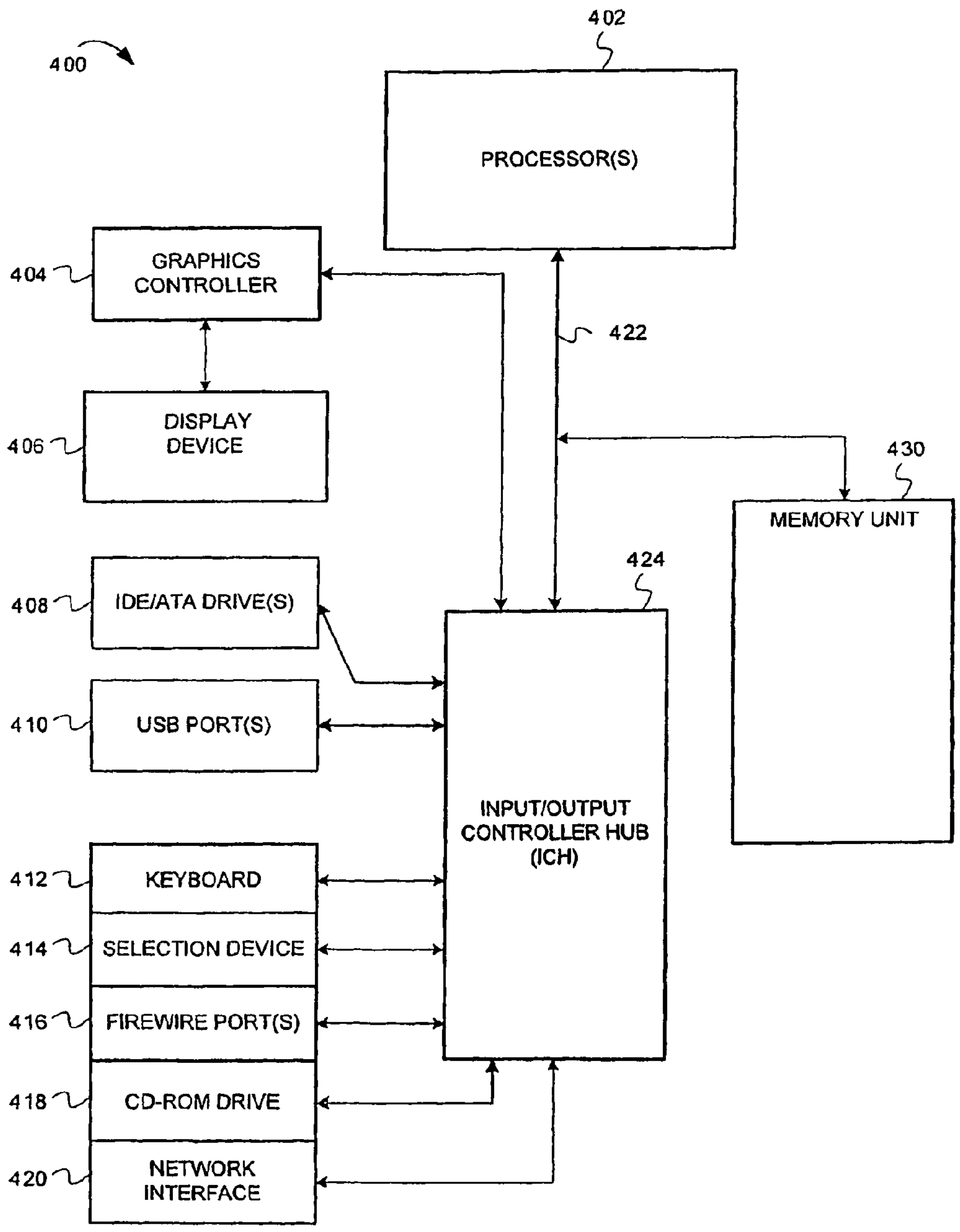
FIG. 4 illustrates a computer device that executes software for performing operations related to remote management of a gaming machine, according to some embodiments of the invention.
Figure 5:
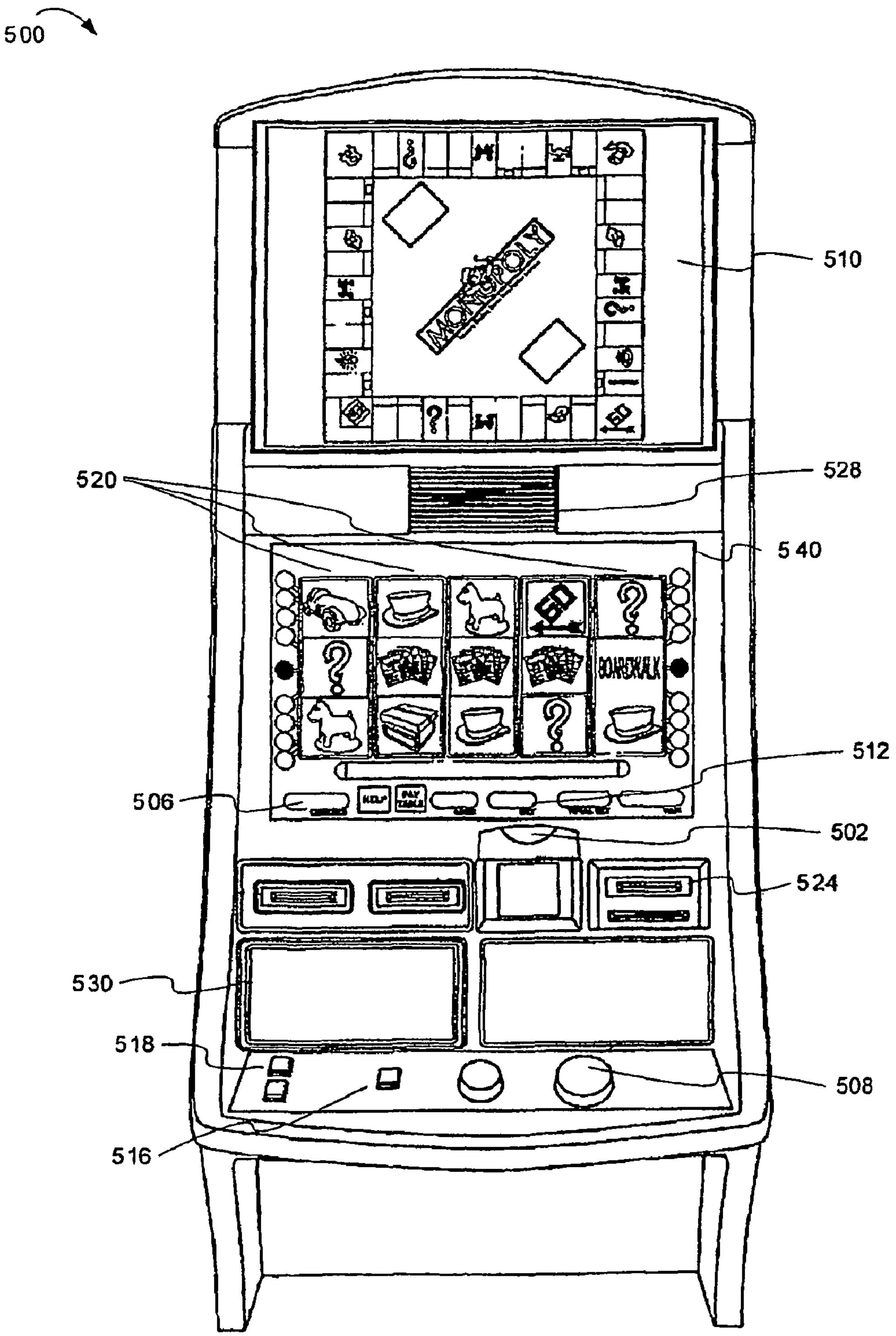
FIG. 5 is a perspective view of a gaming machine, according to exemplary embodiments of the invention.

While FIG. 1 describes a system for remote management of a gaming machine, FIG. 2 illustrates parts of a gaming machine having a host independent subsystem for remote management. FIG. 3 illustrates a message flow among components of the system for deployment of a gaming machine. FIG. 4 illustrates a computer that may be representative of different components in the system 100 (e.g., the master game server 102). FIG. 5 illustrates a perspective view of a gaming machine.

Example Computer System and Gaming Machine

FIG. 2 illustrates a more detailed block diagram of parts of a game machine having a host independent subsystem for remote management, according to some embodiments of the invention. FIG. 2 illustrates a gaming machine 202 that is coupled to remote applications 232 through a network 234. While FIG. 2 is described with reference to a gaming machine, in some embodiments, FIG. 2 may be representative of other components in the system 100 (such as the download managers 108). The gaming machine 202 includes a host platform 204, a system bus 214 and a host-independent subsystem 206. The host platform 204 includes a management agent 205, an application 206, a host operating system 208, a BIOS (Basis Input/Output System) 210 and a host hardware 212.

The host-independent subsystem 206 includes an external interface 218, a host interface 220, a control module 222, an execution environment 224 and subsystem hardware 226. The external interface 218, the host interface 220, the control module 222 and the execution environment 224 may be software, hardware, firmware or a combination thereof.

The subsystem hardware 226 includes a processor 230, a nonvolatile data store 228 and a power module 231. The subsystem hardware 226 may include other components, such as volatile memory, etc. In some embodiments, the nonvolatile data store 228 may be a hard disk drive, removable storage media (e.g., CD ROM, digital video disk, floppy disk), magnetic cassettes, memory cards, FLASH memory or combinations thereof. The power module 231 may representative of a power supply. In some embodiments, the power module 231 operates independent of any power modules/supplies for the host platform 204. Therefore, if power is not being supplied to the host platform 204, the host-independent subsystem 206 may remain powered by the power module 231 and thus operational. The processor 230 may operate independent of a processor that may be part of the host hardware 212.

As further described below, the nonvolatile data store 228 may store firmware-resident asset identifiers, event logs, hardware and software tables, etc. The execution environment 224 may include the operating system and other instructions needed to operate independent of the host platform 204. The execution environment 224 is available even when the host operating system 208 is inoperative or even when the host platform 204 is powered down.

The management agent 204 and the external interface 216 are coupled to the network 234. The application 206 is coupled to the host operating system 208. The application 206, the host operating system 208, the BIOS 210, the host hardware 212 and the host interface 220 are coupled together through the system bus 214.

With reference to FIG. 1, the remote applications 232 may be instructions that are executed on the master game server 102. As further described below, the remote applications 232 may communicate with the host platform 204 or the host-independent subsystem 206. In some embodiments, the remote applications 232 may communicate with the host-independent subsystem 206, independent of the power state or the operating system state of the host platform 204 (i.e., the host power state and the host operating system state, respectively). For example, the host platform 204 may not be powered on and/or the host operating system 208 may not be functioning properly.

The control module 222 may include different instructions that may be executable on the processor 230. For example, the control module 222 may perform management routines for the host-independent subsystem 206.

In some embodiments, the host interface 220 may provide visibility and control of components of the host platform 204. The control module 222 may operate on the hardware and software components (such as the BIOS 210, firmware, the host operating system 208, etc.).

The control module 222 may store logs of different loggable events occurring in the host platform 304 into the nonvolatile data store 328. For example, the control module 222 may receive notification through the host interface 220 that a new operating system is being installed. The control module 222 may store the date and time of the install, the version of the operating system, etc. into a log in the nonvolatile data store 328. The control module 222 may also store the types of operations that are being executed in the host platform 304 after a certain event occurs. For example, certain events may be indicative of a security breach (data corruption, clearing of memory, failure of a Cyclic Redundancy Checking operation, etc.). Accordingly, after such an event, the control module 222 may receive the types of operations that were executed on the host platform 304 from the operating system 308. The logging of such operations may be subsequently used by the master game server 102 to diagnose and repair the gaming machines (as described in more detail below).

Other events to be logged in the nonvolatile data store 328 may include service outages (either failure or operator-induced), game-specific events (such as awards over a given monetary amount), etc. The logging of such events may or may not trigger an error indication for diagnosis to the master game server 102 (see Systems Operations section).

The external interface 218 may connect enabled and authorized remote applications 232 to the control module 222. For example, in some embodiments, authentication techniques (such as digital signatures, CRC checking, etc.) may be used to authorize the remote applications 232, prior to allowing access to the control module 222. Therefore, in some embodiments, as long as the gaming machine 202 is connected to a power source and to the network 234, remote applications 232 may access the host-independent subsystem 206. In some embodiments, the host-independent subsystem 206 may reside in silicon that is outside any memory of the host platform 204 and independent of the host operating system 208.

The external interface 218 may include an administration interface and an operations interface. Both interfaces may be implemented as command-line interfaces or as structured interfaces. Structured interfaces may provide the external communication link between the gaming machine 202 and the remote applications 232 through a messaging/programmatic protocol. Such a protocol may enable the control module 222 to expose their interfaces. The structured interfaces may be exposed as Web services accessed through Simple Object Access Protocol/Extensible Markup Language (SOAP/XML) over different protocols (such as Hypertext Transfer Protocol (HTTP) and defined using Web Services Description Language (WSDL) for machine-to-machine control of the host-independent subsystem 206. In some embodiments, the WSDL element may not reside on the gaming machine 202.

The administration interface may allow the remote applications 232 to manage the host-independent subsystem 206. This administration interface may include configuring the external interface 218 and managing security and firmware updates. The administration interface may provide provisioning services, runtime state services, access control services, message security services, system information services, platform integrity services, security context services, storage services and logging and eventing services.

The operations interface of the external interface 218 may allow the remote applications 232 to access and control the embedded capabilities 232 that affect components of the host platform 204. For example, the operations interface may allow an interface to discovery/introspection services, remotely accessible services, sensor/effector services, baseline manageability functions, etc. In some embodiments, the operations interface may allow for a Hypertext Markup Language (HTML) interface to represent a graphical view of the state and controls of the host platform 204. For example, a graphics button on an HTML page, if selected, may cause the host platform 204 to reboot. As further described below, the host-independent subsystem 206 enables the gaming machine 202 to be machine discoverable and self-describing.

For messages from the remote applications 232 through the external interface 218, the external interface 218 may perform authentication, verification and authorization checks, prior to processing the messages. The messages may be parsed to extract the internal function calls for the host-independent subsystem 206. The host-independent subsystem 206 may issue these function calls locally or may manage the related execution and return the results to the external interface 218. The external interface 218 may encode, secure and transmit the results back to the remote applications 232. In some embodiments, the external interface 218 may use a Web Services (WS)-Management interface. For more information on WS-Management, please refer to Web Services Management (WS-Management) February 2005 and related amendments, authors Akhil Arora (Sun Microsystems, Inc.), Josh Cohen (Microsoft Corporation), Jim Davis (WBEM Solutions, Inc.), Eugene Golovinsky (BMC Software, Inc.), Jackson He (Intel Corporation), David Hines (Intel Corporation), Raymond McCollum (Microsoft Corporation (Editor)), Milan Milenkovic (Intel Corporation), Paul Montegomery (Advanced Micro Devices, Inc.), Jeffrey Schlimmer (Microsoft Corporation), Enoch Suen (Dell Inc.) and Vijay Tewari (Intel Corporation), Copyright 2004/2005. In some embodiments, the host-independent subsystem 206 is exposed as network-addressable end-points that receive and respond to XML.

FIG. 3 illustrates a message flow at different stages of development and deployment of a gaming machine that includes a host-independent subsystem, according to some embodiments of the invention. In particular, FIG. 3 outlines a lifecycle of an embedded capability of the host-independent subsystem 316. For example, FIG. 3 may outline the deployment of a new function call to access a new peripheral on the gaming machine 110, a different part of the hard drive of the gaming machine 110, etc.

FIG. 3 illustrates a gaming machine 302, a gaming machine distributor 304, a remote applications vendor 308 and a master game server 310. In some embodiments, an embedded capability is developed by the gaming machine distributor 304. In operations 1, the gaming machine distributor 304 may deploy the embedded capability to the gaming machine 302. In operation 2, the gaming machine distributor 304 may develop a description of this capability and post the capability (capability WSDL 306). In operation 3, the remote applications vendor 308 may retrieve this description. In operation 4, the remote applications vendor 308 deploys the remote application that uses this capability to the master game server 310.

In operation 5, the master game server 310 discovers the host-independent subsystem 216 of the gaming machine 302 (based on an Internet Protocol (IP) address and port), using the posted embedded capability. In operation 6, the master game server 310 finds the external interface 218, the embedded capability and late binds to endpoint. In operation 7, the master game server 310 then invokes the external interface 218 of the gaming machine 302.

In some embodiments, the control module 222 may be considered part of the firmware of the host platform 204. Accordingly, the control module 222 are delivered by the Original Equipment Manufacturer (OEM) with the host platform 204. In some embodiments, the host-independent subsystem 216 allows for managing of the components (hardware and software) of the host platform 204. In particular, the host interface 220 provides an interface for interacting with managed hardware and software components of the host platform 204. The host-independent subsystem 216 may include drivers for interacting with the hardware of the host platform 204 to support access to and manipulation of information that is management-related.

Through the host interface 220, the control module 222 may discover and identify a managed resource of the host platform 204. A managed resource may include a managed entity, individual sensor/effector or other component that is described by a resource data record. For example, a managed resource may include a gaming application executing on the host platform 204, a library used by a gaming application on the host platform 204, host hardware 212 (such as memory, secondary storage, processors, etc.), etc. An entity includes a device or other logical grouping of sensors/effectors that contains a description of the device or logical entity. In some embodiments, a sensor is defined as a read-only resource that generates an output. In some embodiments, an effector is defined as a controllable resource that may receive a command and effect a change and produce an output. A resource data record may be a descriptor for a particular instance of a managed resource that includes an identity, data type, method of access and other attributes that may be needed for discovery, access and control of the managed resource. The resource data records may be stored in different machine-readable mediums (such as the nonvolatile data store 228).

Through the host interface 220, the control module 222 may read the sensor data of the manageable platform devices and firmware components. Through the host interface 220, the control module 222 may configure the effectors of the manageable platform devices and firmware components. Through the host interface 220, the control module 222 may also process events generated by managed entities.

The host interface 220 may provide a controlled access to manageable host platform features. The host interface 220 may determine which control module 222 may access which manageable host platform features. The host interface 220 may provide safe access to those features, if allowed. In some embodiments, the host interface 220 may control access down to the managed-resource method level. For example, the host interface 220 may allow for a write command to a particular effector instance. However, the host interface 220 may define an update to a default start-up value of this particular effector from a same source. The host interface 220 may define intra-platform message formats, namespaces and records that may fully describe and address the manageable components of the host platform 204.

In some embodiments, the components of the host platform 204 (such as cryptographic accelerators in the host hardware 212) may provide for overall security of the host platform 204. The host-independent subsystem 216 may provide for its own firmware storage and enforcement of platform-management keys. The host-independent subsystem 216 may control access policies for the management of the host platform 204. The host-independent subsystem 216 may provide for validation of embedded capability integrity and execution. Moreover, the host-independent subsystem 216 may provide validation and monitoring of provisioning processes and module/images as related to discrete manageability hardware. Access policies may control the visibility and security of data and Internet Protocol.

In some embodiments, the access to shared machine resources is controlled by the host-independent subsystem 216. Further, in some embodiments, the host-independent subsystem 216 may not access protected resources in the host platform 204. For example, the host-independent subsystem 216 may not be able to provide access to chipset control for protected memory. In some embodiments, the host-independent subsystem 216 may not contend for host resources (such as memory, processors and/or storage). A more detailed description of the operations of the gaming device 302 shown in FIG. 2 is described in more detail below (see System Operations section).

FIG. 4 illustrates a computer device that executes software for performing operations related to remote management of a gaming machine, according to some embodiments of the invention. FIG. 4 illustrates a computer device that may be representative of the master game server 102. As illustrated in FIG. 4, the computer system 400 comprises processor(s) 402. The computer system 400 also includes a memory unit 430, processor bus 422, and Input/Output controller hub (ICH) 424. The processor(s) 402, memory unit 430, and ICH 424 are coupled to the processor bus 422. The processor(s) 402 may comprise any suitable processor architecture. The computer system 400 may comprise one, two, three, or more processors, any of which may execute a set of instructions in accordance with embodiments of the invention.

The memory unit 430 may store data and/or instructions, and may comprise any suitable memory, such as a dynamic random access memory (DRAM). The computer system 400 also includes IDE drive(s) 408 and/or other suitable storage devices. A graphics controller 404 controls the display of information on a display device 406, according to some embodiments of the invention.

The input/output controller hub (ICH) 424 provides an interface to I/O devices or peripheral components for the computer system 400. The ICH 424 may comprise any suitable interface controller to provide for any suitable communication link to the processor(s) 402, memory unit 430 and/or to any suitable device or component in communication with the ICH 424. For one embodiment of the invention, the ICH 424 provides suitable arbitration and buffering for each interface.

For some embodiments of the invention, the ICH 424 provides an interface to one or more suitable integrated drive electronics (IDE) drives 408, such as a hard disk drive (HDD) or compact disc read only memory (CD ROM) drive, or to suitable universal serial bus (USB) devices through one or more USB ports 410. For one embodiment, the ICH 424 also provides an interface to a keyboard 412, a mouse 414, a CD-ROM drive 418, one or more suitable devices through one or more firewire ports 416. For one embodiment of the invention, the ICH 424 also provides a network interface 420 though which the computer system 400 can communicate with other computers and/or devices.

In some embodiments, the computer system 400 may be employed as the master game server 102, the download manager 108, or the gaming machine 110. In some embodiments, the computer system 400 includes a machine-readable medium that stores a set of instructions (e.g., software) embodying any one, or all, of the methodologies for remote management of a gaming machine described herein. Furthermore, software may reside, completely or at least partially, within memory unit 430 and/or within the processor(s) 402.

While FIG. 4 describes a computer system that may be used in conjunction with embodiments of the invention. FIG. 5 describes embodiments of a gaming machine that may be used with embodiments of the invention.

FIG. 5 is a perspective view of a gaming machine, according to exemplary embodiments of the invention. As shown in FIG. 5, the gaming machine 500 can be a computerized slot machine having the controls, displays, and features of a conventional slot machine.

The gaming machine 500 can be operated while players are standing or seated. Additionally, the gaming machine 500 is preferably mounted on a stand (not shown). However, it should be appreciated that the gaming machine 500 can be constructed as a pub-style tabletop game (not shown), which a player can operate while sitting. The gaming machine 500 may also be in the form of a handheld device. For example, the gaming machine 500 may be part of a Personal Digital Assistant (PDA), cellular telephone, etc. Furthermore, the gaming machine 500 can be constructed with varying cabinet and display designs. The gaming machine 500 can incorporate any primary game such as slots, poker, or keno, and additional bonus round games. The symbols and indicia used on and in the gaming machine 500 can take mechanical, electrical, or video form.

As illustrated in FIG. 5, the gaming machine 500 includes a coin slot 502 and bill acceptor 524. Players ban place coins in the coin slot 502 and paper money or ticket vouchers in the bill acceptor 524. Other devices can be used for accepting payment. For example, credit/debit card readers/validators can be used for accepting payment. Additionally, the gaming machine 500 can perform electronic funds transfers and financial transfers to procure monies from financial accounts. When a player inserts money in the gaming machine 50Q, a number of credits corresponding to the amount deposited are shown in a credit display 506. After depositing the appropriate amount of money, a player can begin playing the game by pushing play button 508. The play button 508 can be any play activator used for starting a wagering game or sequence of events in the gaming machine 500.

As shown in FIG. 5, the gaming machine 500 also includes a bet display 512 and a “bet one” button 516. The player places a bet by pushing the bet one button 516. The player can increase the bet by one credit each time the player pushes the bet one button 516. When the player pushes the bet one button 516, the number of credits shown in the credit display 506 decreases by one credit, while the number of credits shown in the bet display 512 increases by one credit.

A player may “cash out” by pressing a cash out button 518. When a player cashes out, the gaming machine 500 dispenses a voucher or currency corresponding to the number of remaining credits. The gaming machine 500 may employ other payout mechanisms such as credit slips (which are redeemable by a cashier) or electronically recordable cards (which track player credits), or electronic funds transfer.

The gaming machine also includes a primary display unit 504 and a secondary display unit 510 (also known as a “top box”). The gaming machine may also include an auxiliary video display 540. In one embodiment, the primary display unit 504 displays a plurality of video reels 520. According to embodiments of the invention, the display units 504 and 510 can include any visual representation or exhibition, including moving physical objects (e.g., mechanical reels and wheels), dynamic lighting, and video images. In one embodiment, each reel 520 includes a plurality of symbols such as bells, hearts, fruits, numbers, letters, bars or other images, which correspond to a theme associated with the gaming machine 500. Furthermore, as shown in FIG. 5, the gaming machine 500 includes an audio presentation unit 528. The audio presentation unit 528 can include audio speakers or other suitable sound projection devices.

In one embodiment, a plurality of gaming machines can be connected to a plurality of download managers in a gaming network. In the gaming network, the gaming machines may be remotely managed, as described herein. Additionally, the gaming machines can conduct casino style wagering games based on the gaining content.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

Figure 6:
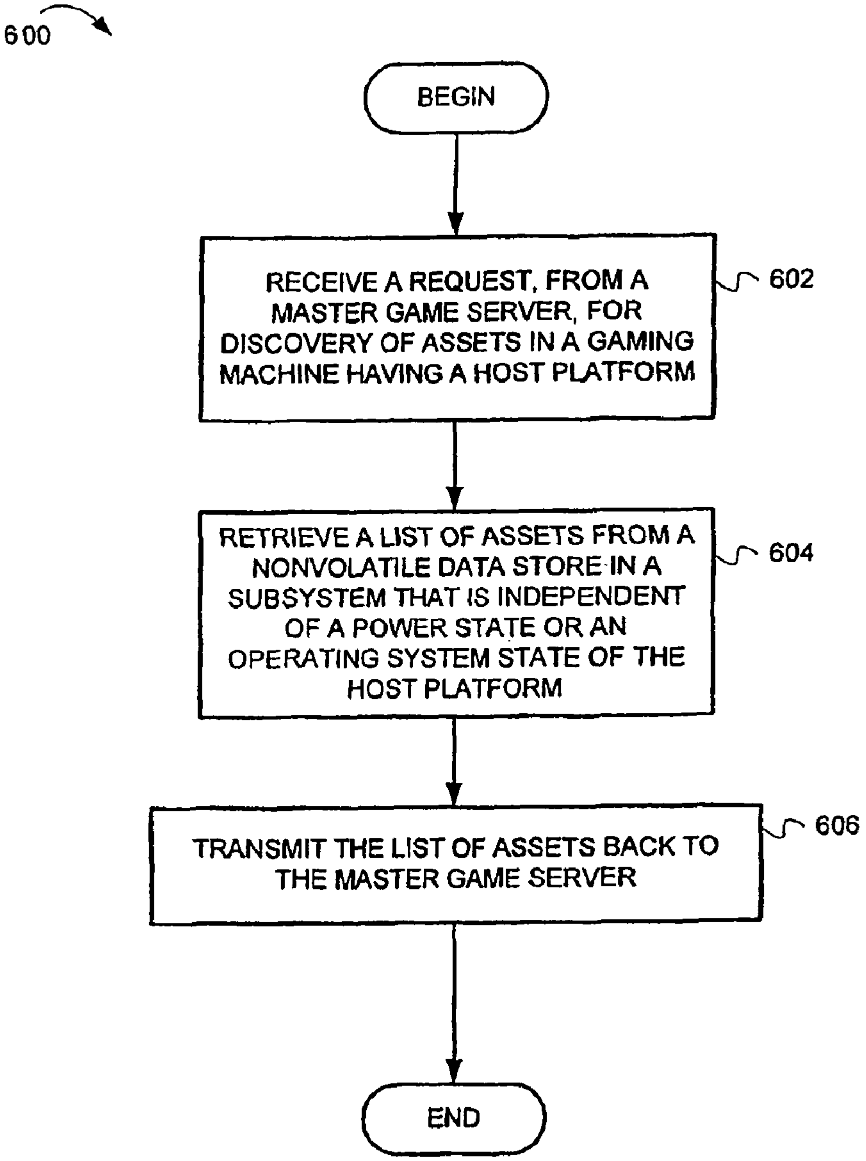
FIG. 6 illustrates a flow diagram for asset management independent of the power or operating system states of the host platform of the gaming machines, according to some embodiments of the invention.

Some embodiments provide asset management (include hardware and software) independent of the power or operating system states of the host platform of the gaming machines. In particular, FIG. 6 illustrates a flow diagram for asset management independent of the power or operating system states of the host platform of the gaming machines, according to some embodiments of the invention. FIG. 6 illustrates operations that may be executed by components within the host-independent subsystem 216 (shown in FIG. 2). The flow diagram 600 is described with reference to FIGS. 1-2. The flow diagram 600 commences at block 602.

At block 602, a request is received, from a master game server, for discovery of assets in a gaming machine having a host platform. In some embodiments, the external interface 218 may receive this request from one of the remote applications 232 executing on the master game server 102. The request may include a request for software or hardware on the host platform 204. For example, the remote application 232 may request the types of games and versions of such games that are installed and that may be executed on the gaming machine 202. The remote application 232 may request the type of processor, the amount of volatile memory, the size of the secondary storage, etc. of the host platform 204. Alternatively or in addition, the remote application 232 may request information regarding the software or hardware for a peripheral of the gaming machine 202 (such as a printer, bill acceptor, etc.). With reference to FIG. 1, the master game server 102 may transmit this request to individual gaming machines 110, banks of gaming machines 110, one or more download managers 108, etc. For example, the master game server 102 may broadcast this request to all gaming machines coupled to the network 106. The flow continues at block 604.

At block 604, a list of assets is retrieved from a nonvolatile data store in a subsystem that is independent of a power state or an operating system state of the host platform. With reference to FIG. 2, the control module 222 may receive this request from the external interface 218. In some embodiments, the external interface 218 may first authenticate the origination of the request. For example, the request may include a digital certificate, may be encrypted using a public/private pair encryption, etc. Therefore, the external interface 218 may forwarded the request to the control module 222 after this authentication. In some embodiments, a function call within the control module 222 accesses this list of assets from the nonvolatile data store 228.

This list of assets may be stored and updated by the control module 222. For example, the control module 222 may access data for this list of assets from a data store in the host hardware 212 of the host platform 212. In particular, the list of assets may be stored in a hard drive of the host hardware 212 and updated each time the assets of the gaming machine 202 are updated. Alternatively or in addition, the host interface 220 may query the components of the host hardware 212 to determine the types and versions of the hardware therein. Additionally, the host interface 220 may query the hard drive of the host hardware 212 to determine the types of and versions of software installed on the host platform 204. In some embodiments, the host interface 220 may performs these queries periodically when the host platform 204 has power and the host operating system 208 of the host platform 204 is operational. In some embodiments, after an asset is updated in the host platform 204, the control module 222 may receive an indication of such change and update the nonvolatile data store 228 accordingly. The control module 222 may retrieve this list of assets from the nonvolatile data store 228. The flow continues at block 606.

At block 606, the list of assets is transmitted back to the master game server. In some embodiments, the external interface 218 may transmit the list of assets back to the master game server 102. In some embodiments, the external interface 218 may encrypt (e.g., public/private key encryption) the list of assets prior to transmitting the data. In some embodiments, the operations of the flow diagram 600 may be performed independent of the power state and the operating system state of the host platform 204. For example, the host platform 204 may not have power supplied thereto and/or the host operating system 208 of the host platform 204 may not be operational. Therefore, if the master game server 102 is attempting to retrieve the assets for a number of gaming machines 110 on the network, such data may be retrieved independent of whether the gaming machines 110 are powered on and/or operational.

The assets for the different gaming machines 110 are more likely to dynamically change as gaming content is downloaded over the network 106. Using the operations of the flow diagram 600, the master game server 102 may maintain an update inventory of the number and types of gaming machines on the network 106, their hardware/software configurations, etc. Furthermore, such embodiments may not require an operator to physically visit each gaming machine 110 to discover such information. The operations of the flow diagram 600 are complete.

In some embodiments, the master game server 102 may use the results of these operations to download new gaming content to the gaming machines 110. For example, the master game server 110 may determine that a given gaming machine 110 has version 1.1 of game X using these discovery operations. The master game server 110 may determine that an updated version (version 1.2) of game X is stored in the gaming and licensing content store 104. The master game server 110 may then transmit version 1.2 to this gaming machine 110 for installation and activation.

Another application of the operations of the flow diagram 600 may include the placement of used gaming machines onto a casino floor. After these gaming machines are coupled to the network and to power, the operations of the flow diagram 600 may discover that the gaming machines are on the floor along with the hardware, software, etc. thereon. The master game server 102 may then perform any updates necessary by downloading data over the network. For example, the master game server 102 may download an updated operating system, a new game, etc. Similarly, another application may include the loading of software onto gaming machines during manufacturing. Accordingly, the operating system, games, etc. may be downloaded for the host platform 304 using the host-independent subsystem 316.

Figure 7:
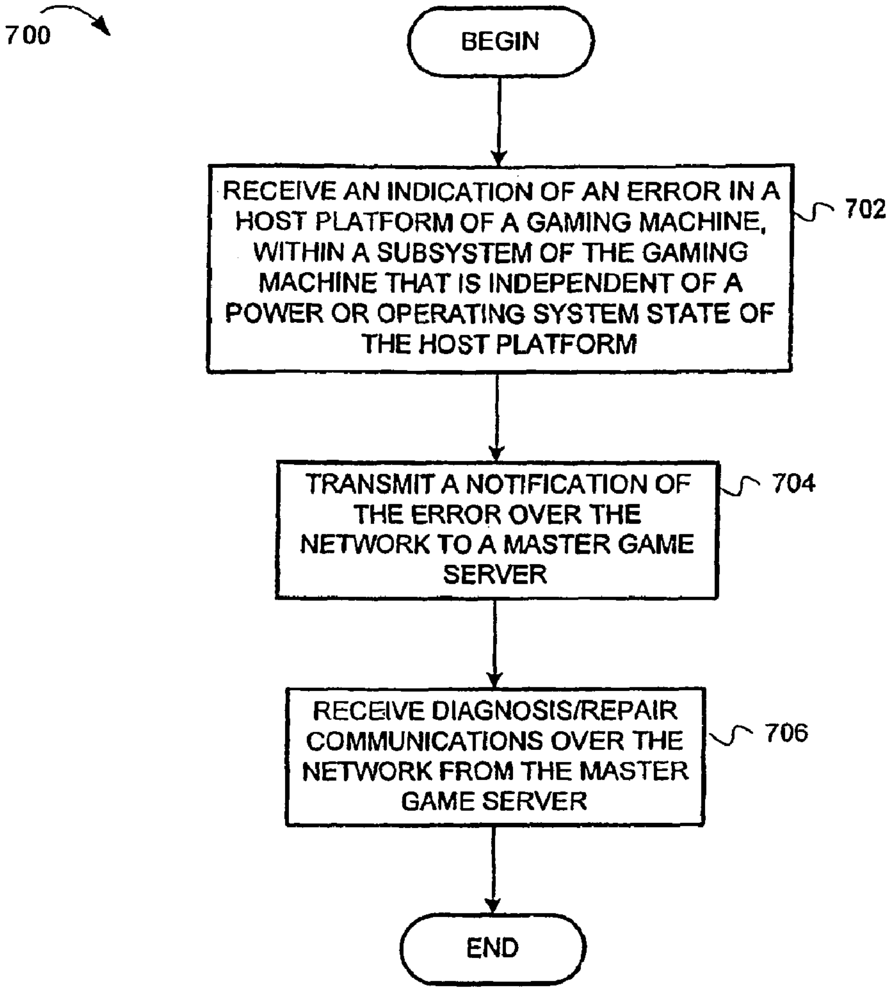
FIG. 7 illustrates a flow diagram for diagnosis and repair of gaming machines independent of the power or operating system states of the host platform of the gaming machines, according to some embodiments of the invention.

Some embodiments may provide diagnosis and repair of gaming machines 110 independent of the power or operating system states of the host platform of the gaming machines. In particular, FIG. 7 illustrates a flow diagram for diagnosis and repair of gaming machines independent of the power or operating system states of the host platform of the gaming machines, according to some embodiments of the invention. FIG. 7 illustrates operations that may be executed by components within the host-independent subsystem 216 (shown in FIG. 2). The flow diagram 700 is described with reference to FIGS. 1-2. The flow diagram 700 commences at block 702.

At block 702, an indication of an error in a host platform of a gaming machine is received within a subsystem of the gaming machine that is independent of a power and operating system state of the host platform. In some embodiments, the control module 222 may receive this indication from a component of the host platform 204 through the host interface 220. For example, if there is a boot failure of the host platform 204, the BIOS 210 may generate this indication. The boot failure may occur because of a missing or corrupted file (such as a library file), a hardware failure (such as hard drive or memory failure, etc.), etc. The indication may include data that is representative of the error. For example, the error may indicate that a library file is missing, the boot could not be completed, etc. The control module 222 may store this error indication in the nonvolatile data store 228. In some embodiments, the indication of the error may be in the form of not receiving a message. For example, in some embodiments, the host platform 204 may periodically transmit an indication that the host platform 204 is operational. Therefore, if this indication is not received at these periodic intervals, an indication of an error may be received. The control module 222 may store this indication into the nonvolatile data store 228.

In some embodiments, the indication may relate to the peripherals of the gaming machine 110. For example, if the door is opened, the bill acceptor is removed, etc., the host interface 320 may receive and store this indication in the nonvolatile data store 328. The indication may include the time of day when the event occurred. The time of day and the time period that such events occurred may be stored with the indication. The flow continues at block 704.

At block 704, a notification of the error is transmitted over the network to the master game server. In some embodiments, the control module 222 may forward this notification to the external interface 218. The external interface 218 may encrypt, digitally sign, etc. the notification. The external interface 218 may transmit the notification over the network 106 to the master game server 102. The flow continues at block 706.

At block 706, diagnosis/repair communications are received over the network from the master game server. In some embodiments, the external interface 218 may receive the diagnosis/repair communications over the network 106 from the master game server 102. In some embodiments, the master game server 102 may diagnosis the error remotely using Serial over LAN/IDE-Redirect (SOL/IDE-R). In some embodiments, the master game server 102 may query different parts of the host platform 204 through the host interface 220. For example, the master game server 102 may attempt to access different parts of the hard drive or the memory of the host platform 204. The master game server 102 may query whether certain files are accessible on the hard drive.

In some embodiments, the master game server 102 may repair the host platform 204. For example, the master game server 102 may determine (based on the initial indication and/or the diagnosis) that a file is corrupted. Accordingly, the master game server 102 may transmit a new copy of the file to the external interface 218. The host interface 220 may install the new copy into the hard drive of the host platform 204. Furthermore, the master game server 102 may send a communication to then reboot the host platform 204. In particular, as described above, the host interface 220 may have access to drivers on the host platform 204 to cause the reboot of the host platform 204. The operations of the flow diagram 700 are complete.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to “one embodiment” or “an embodiment” mean that the feature being referred to is included in at least one embodiment of the invention. Further, separate references to “one embodiment” in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase “exemplary embodiment” means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A non-transitory machine-readable medium having stored thereon instructions which when executed by a machine cause the machine to perform operations comprising:

receiving a request, from a game server, for discovery for an inventory of assets in a gaming machine having a host platform, the host platform having a host processor;

retrieving a list of the inventory of assets from a data store in a subsystem that is independent of a power state or an operating system state of the host platform, the subsystem having a subsystem processor that operates independent of the host processor; and transmitting the list of the inventory of assets back to the game server.

2. The non-transitory machine-readable medium of claim 1, wherein retrieving the list of the inventory of assets comprises retrieving the list of the inventory of assets during a time when the power state of the host platform is off.

3. The non-transitory machine-readable medium of claim 1, wherein retrieving the list of the inventory of assets comprises retrieving the list of the inventory of assets during a time when the operating system state of the host platform is non-operational.

4. The non-transitory machine-readable medium of claim 1, wherein retrieving the list of the inventory of assets comprises retrieving a list of games installed on the host platform of the gaming machine.

5. The non-transitory machine-readable medium of claim 1, wherein retrieving the list of the inventory of assets comprises retrieving a list of hardware assets of the host platform of the gaming machine.

6. The non-transitory machine-readable medium of claim 1, wherein the data store comprises a nonvolatile data store that is separate from the storage of the host platform.

7. The non-transitory machine-readable medium of claim 1, wherein the instructions further comprise storing in the data store at least one of: an identification of a wagering game, an identification of a version of the wagering game, or an identification of the host platform.

8. The non-transitory machine-readable medium of claim 1, wherein the instructions further comprise storing a log entry in the nonvolatile data store for a loggable event.

9. The non-transitory machine-readable medium of claim 8, wherein the loggable event includes one or more of: a corruption of data in the storage of the host platform, an installation of a new version of the host operating system, or an award above a monetary amount in the wagering game.

10. The non-transitory machine-readable medium of claim 1, wherein the instructions further comprise:

querying the host platform for the list of the inventory of assets; and updating the data store with the list of the inventory of assets.

11. The non-transitory machine-readable medium of claim 10, wherein querying the host platform includes reading the list of the inventory of assets from a host platform data store.

12. The non-transitory machine-readable medium of claim 1, wherein the instructions further comprise controlling, by the subsystem, access to resources of the host platform.

13. A method comprising:

receiving a request, from a requestor, for discovery for an inventory of assets in a gaming machine having a host platform, the host platform having a host processor;

retrieving a list of the inventory of assets from a data store in a subsystem that is independent of a power state or an operating system state of the host platform, the subsystem having a subsystem processor that operates independent of the host processor; and transmitting the list of the inventory of assets back to the requestor.

14. The method of claim 13, wherein retrieving the list of the inventory of assets comprises retrieving the list of the inventory of assets during a time when the power state of the host platform is off.

15. The method of claim 13, wherein retrieving the list of the inventory of assets comprises retrieving the list of the inventory of assets during a time when the operating system state of the host platform is non-operational.

16. The method of claim 13, wherein retrieving the list of the inventory of assets comprises retrieving one or more of: a list of games installed on the host platform of the gaming machine or a list of hardware assets of the host platform of the gaming machine.

17. The method of claim 13, wherein the data store comprises a nonvolatile data store that is separate from the storage of the host platform.

18. The method of claim 13, and further comprising storing in the data store at least one of: an identification of a wagering game, an identification of a version of the wagering game, or an identification of the host platform.

19. The method of claim 13, and further comprising storing a log entry in the nonvolatile data store for a loggable event.

20. The method of claim 19, wherein the loggable event includes one or more of: a corruption of data in the storage of the host platform, an installation of a new version of the host operating system, or an award above a monetary amount in the wagering game.

21. An apparatus comprising:

a host platform having a host processor controlled by a host operating system, the host platform having a host storage and a host power state, wherein the host processor is configured to execute instructions that include a wagering game; and a subsystem having a processor that is separate from the host processor and executes independently of the host operating system and the host power state, the subsystem further having a nonvolatile data store that is separate from the storage of the host platform, the subsystem operable to:

receive a request from a requestor for discovery of an inventory of assets in the host platform, retrieve a list of the inventory of assets from the nonvolatile data store, and transmit the list of the inventory of assets to the requestor.

22. The apparatus of claim 21, wherein the subsystem retrieves the list of the inventory of assets during a time when the power state of the host platform is off.

23. The apparatus of claim 21, wherein the subsystem retrieves the list of the inventory of assets during a time when the operating system state of the host platform is non-operational.

24. The apparatus of claim 21, wherein the list of the inventory of assets comprises one or more of: a list of games installed on the host platform of the gaming machine or a list of hardware assets of the host platform of the gaming machine.

25. The apparatus of claim 21, wherein the nonvolatile data store is further to store at least one of: an identification of a wagering game, an identification of a version of the wagering game, or an identification of the host platform.

26. The apparatus of claim 21, wherein the subsystem further stores a log entry in the nonvolatile data store for a loggable event.

27. The apparatus of claim 26, wherein the loggable event includes one or more of: a corruption of data in the storage of the host platform, an installation of a new version of the host operating system, or an award above a monetary amount in the wagering game.

* * * * *

UNITED STATES PATENT AND TRADEMARK OFFICE

CERTIFICATE OF CORRECTION

PATENT NO. : 8,192,288 B2
APPLICATION NO. : 11/997610
DATED : June 5, 2012
INVENTOR(S) : Sylla et al.

It is certified that error appears in the above-identified patent and that said Letters Patent is hereby corrected as shown below:

In Column 3, line 3, delete “for” and insert --or--, therefor

In Column 4, line 32, after “RS-232,”, delete “¶” and insert -- --, therefor

In Column 5, line 21, after “may”, insert --be--, therefor

In Column 10, line 17, delete “ban” and insert --can--, therefor

In Column 10, line 24, delete “50Q” and insert --500--, therefor

In Column 10, line 67, delete “gaining” and insert --gaming--, therefor

In Column 13, line 47, delete “diagnosis” and insert --diagnose--, therefor

In Column 15, line 10, in Claim 7, after “of:”, insert --¶--, therefor

In Column 15, line 17, in Claim 9, after “of:”, insert --¶--, therefor

In Column 15, line 54, in Claim 16, after “of:”, insert --¶--, therefor

In Column 16, line 5, in Claim 18, after “of:”, insert --¶--, therefor

In Column 16, line 11, in Claim 20, after “of:”, insert --¶--, therefor

In Column 16, line 40, in Claim 24, after “of:”, insert --¶--, therefor

In Column 16, line 45, in Claim 25, after “of:”, insert --¶--, therefor

In Column 16, line 52, in Claim 27, after “of:”, insert --¶--, therefor

Signed and Sealed this
Second Day of October, 2012

David J. Kappos
*Director of the United States Patent and Trademark Office*